United States Patent [19]

O'Banion

[11] Patent Number: 5,199,343

[45] Date of Patent: Apr. 6, 1993

[54] POWER SAW WITH LOUVERED BLADE GUARD

[75] Inventor: Michael L. O'Banion, Westminster, Md.

[73] Assignee: Black & Decker Inc., Newark, Del.

[21] Appl. No.: 774,774

[22] Filed: Oct. 9, 1991

[51] Int. Cl.⁵ .............................................. B23D 47/00
[52] U.S. Cl. ..................................... 83/397; 83/471.2; 83/478; 83/490; 83/520
[58] Field of Search ....................... 83/478, 397, 397.1, 83/398, 544, 545, 546, 520; 30/286, 390, 391

[56] References Cited

U.S. PATENT DOCUMENTS

| | | | |
|---|---|---|---|
| D. 305,542 | 1/1990 | Miyamoto et al. | D15/133 |
| 1,091,156 | 3/1914 | Nelson | 83/478 |
| 1,125,364 | 1/1915 | Martin | 83/440.2 |
| 1,148,169 | 7/1915 | Howe | 83/440.2 |
| 1,375,698 | 4/1921 | Howe | 83/478 |
| 1,879,280 | 9/1932 | James | 83/477 |
| 1,993,219 | 3/1935 | Merrigan | 83/478 X |
| 1,999,138 | 4/1935 | Mason | |
| 2,095,330 | 10/1937 | Hedgpeth | 83/478 X |
| 2,163,320 | 6/1939 | Hammond | 83/102.1 |
| 2,267,189 | 12/1941 | Brown | |
| 2,313,686 | 3/1943 | Uremovich | 83/478 |
| 2,352,235 | 6/1944 | Tautz | 873/102.1 |
| 2,488,947 | 11/1949 | Vavrik | |
| 2,623,555 | 12/1952 | Eschenburg | 83/478 X |
| 3,104,688 | 9/1963 | Bretthauer | |
| 3,123,111 | 3/1964 | Mattson | |
| 4,257,297 | 3/1981 | Nidbella | 83/471.3 |
| 4,450,627 | 5/1984 | Morimoto | 30/391 |
| 4,805,504 | 2/1989 | Fushiya et al. | 83/397 |
| 4,934,233 | 6/1990 | Brundage et al. | 83/397 |

FOREIGN PATENT DOCUMENTS

| | | | |
|---|---|---|---|
| 511018 | 5/1952 | Belgium | 30/391 |
| 20020 | 11/1882 | Fed. Rep. of Germany | 83/478 |
| 3104340 | 5/1986 | Fed. Rep. of Germany | . |
| 3500371 | 1/1988 | Fed. Rep. of Germany | . |
| 358579 | 1/1962 | Switzerland | . |
| 599718 | 3/1948 | United Kingdom | . |
| 674894 | 7/1952 | United Kingdom | . |
| 782280 | 9/1957 | United Kingdom | . |
| 1016387 | 1/1966 | United Kingdom | . |

Primary Examiner—Frank T. Yost
Assistant Examiner—Clark F. Dexter
Attorney, Agent, or Firm—Charles E. Yocum; Dennis A. Dearing; John D. Del Ponti

[57] ABSTRACT

A power miter saw having a circumferential louvered blade guard that articulates relative to the saw blade as the miter saw is pivoted downwardly into engagement with the workpiece. The louvers in the guard are specially configured to substantially prevent or impede the ejection of cutting debris through the louvers while also permitting the operator to precisely align the saw blade with a mark on the workpiece while maintaining a stationary vision point from a natural operating position, regardless of the angle of articulation of the guard.

10 Claims, 5 Drawing Sheets

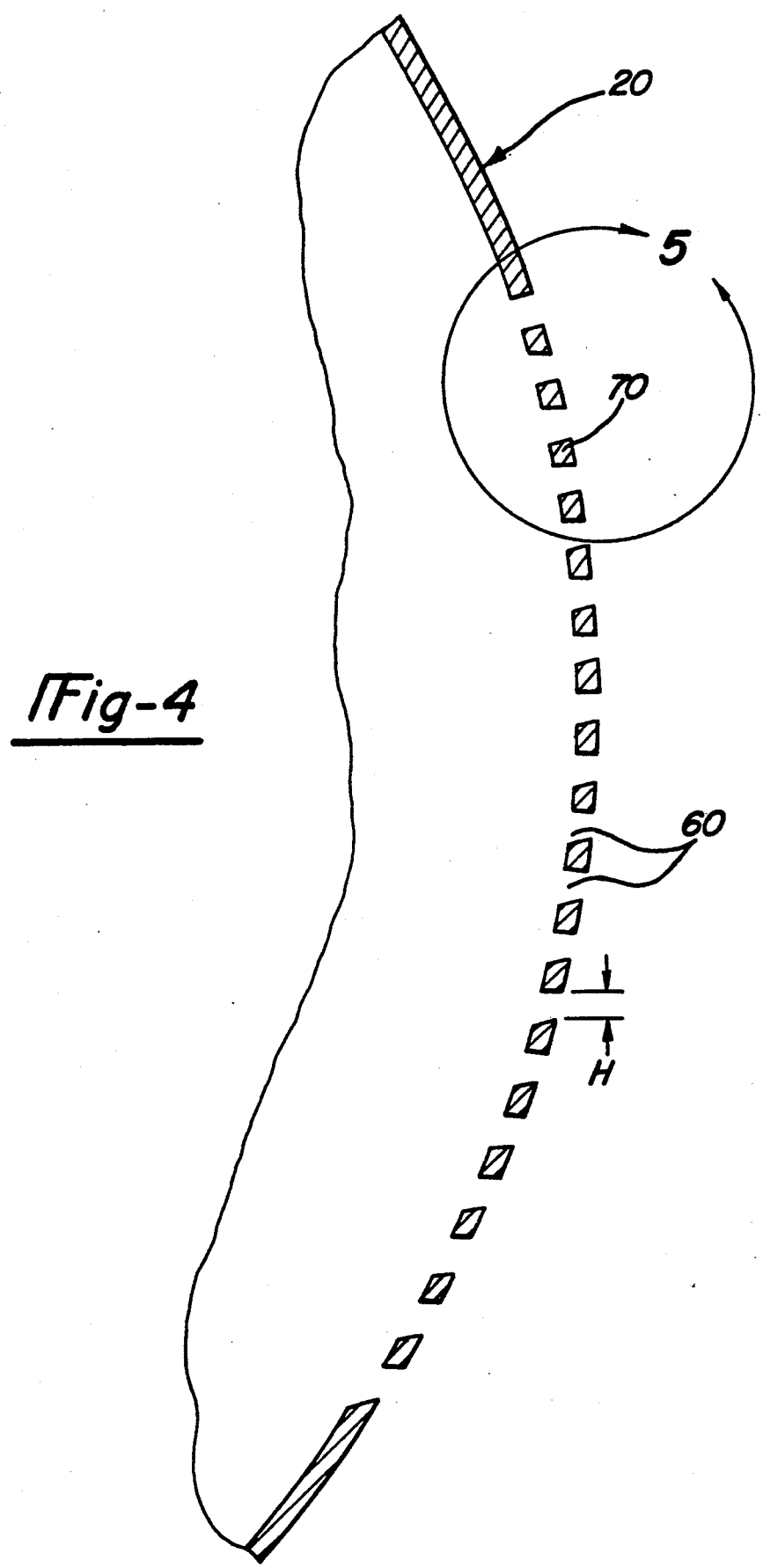

POWER SAW WITH LOUVERED BLADE GUARD

BACKGROUND AND SUMMARY OF THE INVENTION

This invention relates generally to a guard device for a power saw having a circular blade, and more specifically to a circumferential guard which allows the operator of the saw to view the saw blade in relation to the desired cut to be made in the workpiece.

In general, it is desirable to provide for a guard to use in conjunction with a power saw. The guard primarily serves to protect the operator from the blade of the saw, as well as helping to confine saw dust and other particles generated during the sawing process. However, as both professional and home do-it-yourselfers can appreciate, conventional guards have the undesirable side effect of also obscuring the operator's vision of the position of the saw blade relative to the workpiece, thereby making it difficult to make precise cuts.

The most frequently proposed solution to this problem is to provide a blade guard that is composed of a transparent material. However, such devices suffer the disadvantage of providing rapidly deteriorating visibility with use caused by scratching and clouding of the material, as well as particles "sticking" to the surface of the guard. Thus, a transparent guard does not satisfactorily solve the problem.

In addition, it has been proposed to provide guards having viewing slats or holes formed along the lateral surfaces of the saw guard. These devices, however, have the disadvantage of not allowing the operator to visually align the saw blade with the mark on the workpiece. Due to parallax, it is difficult for the operator to precisely align the saw blade when viewing it from an angle relative to the plane of the blade. Thus, these devices also fail to adequately solve the above-described problem.

It is therefore desirable to provide a saw blade guard that allows the operator to precisely align the saw blade in relation to the workpiece when the operator is in the normal operating position. In addition, it is desirable to provide a guard which enables such viewing without diminishing the effectiveness of the guard as a protective device. It is further desirable to design the saw blade guard in a manner adapted for efficient manufacturing so as to ensure that the saw blade guard can be produced economically.

To achieve the foregoing objectives, the present invention provides a circumferential guard for a power saw where the power saw is adaptable to accommodate circular blades of a given range of radii, the guard comprising: a semi-circular channel, the channel having a radius greater than the radius of the saw blade and having a channel width much wider than the thickness of the saw blade. The guard is pivotally attached to the power saw so as to cover the upper radial portion of the saw blade and to substantially center the saw blade between the walls of the channel. The guard further has a plurality of louvers disposed along the width-wise edge of the channel, the louvers enabling the operator to align the saw blade with the workpiece. In one embodiment according to the present invention, the louvers are cut into the width-wise edge of the channel in a manner so as to provide viewing access (from a stationary natural operating stance) by the operator throughout the range of movement of the saw blade and the guard. In an alternative embodiment of the invention, the louvers are configured such that the height of each louver opening is less than the thickness of the guard.

Other objects, features, and advantages of the present invention will be readily appreciated and better understood by referring to the following description and accompanying drawings.

BRIEF DESCRIPTION OF THE DRAWINGS

FIG. 4 is an enlarged sectional view, taken from FIG. 2 along line 4, depicting the orientation of the louvers in a first preferred embodiment;

DESCRIPTION OF THE PREFERRED EMBODIMENT

Figure 1:
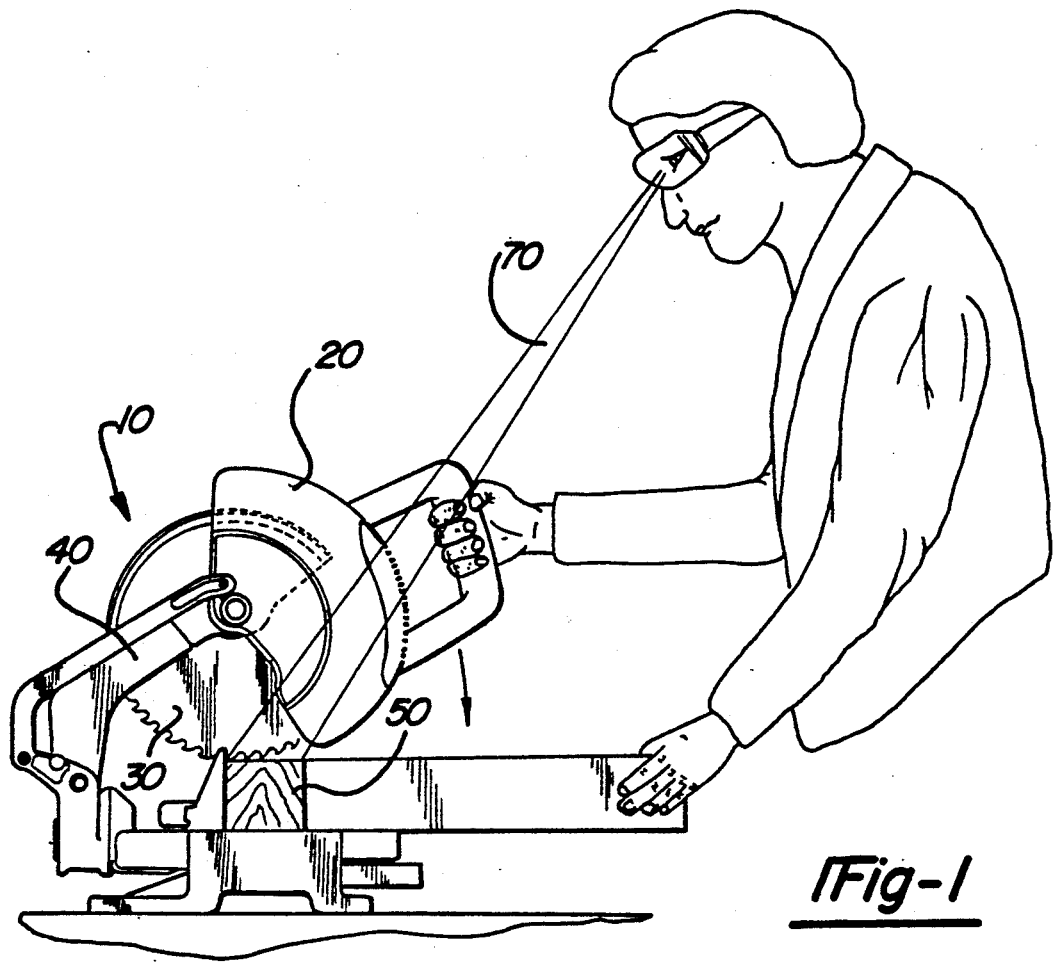
FIG. 1 is a side view of a power miter saw incorporating a louvered blade guard according to the present invention, and showing an operator viewing a workpiece through the louvered saw blade guard.
Figure 2:
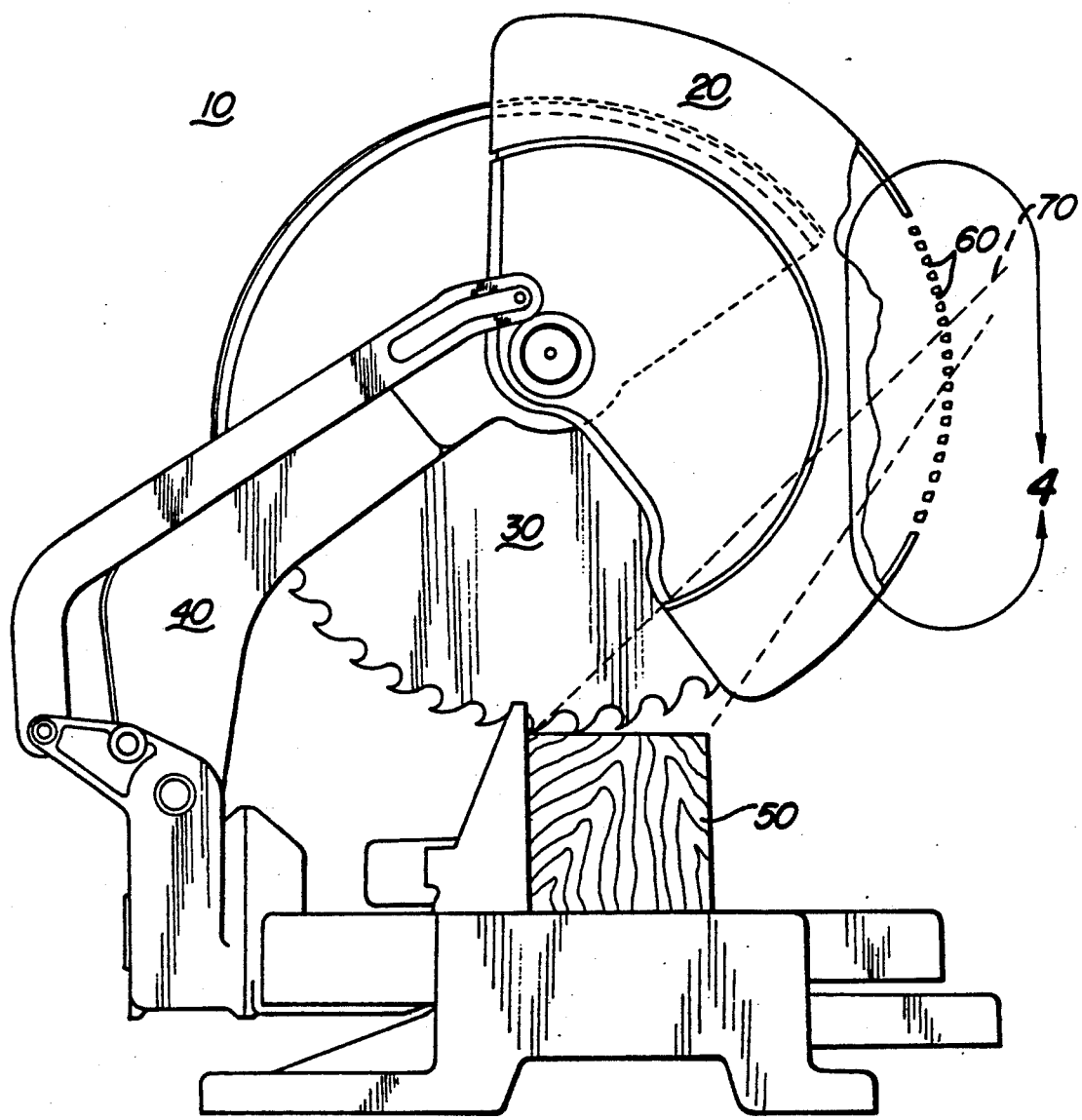
FIG. 2 is a side view of the power miter saw showing the saw blade and guard in the articulated position corresponding to the initiation of a cutting operation of a relatively tall workpiece.

As shown generally in FIGS. 1 and 2, a miter saw 10 having a circumferential guard 20 of the present invention is provided. Specifically, the miter saw has a circular saw blade 30 which is shielded by the guard 20. The guard 20 is pivotally attached to the miter saw 10, and also has a pivot arm assembly 40 linked between the miter saw arm and the guard 20 to help ensure proper articulation of the guard throughout the range of movement of the miter saw 10. As can best be seen in FIG. 1, an operator using the miter saw 10 to cut a workpiece 50 is able to view the workpiece 50 through the louvers 60 in the guard 20. The operator's line of sight 70 is unobstructed through the louvers 60, allowing the operator to line up the saw blade 30 with the marking on the workpiece 50.

Figure 5:
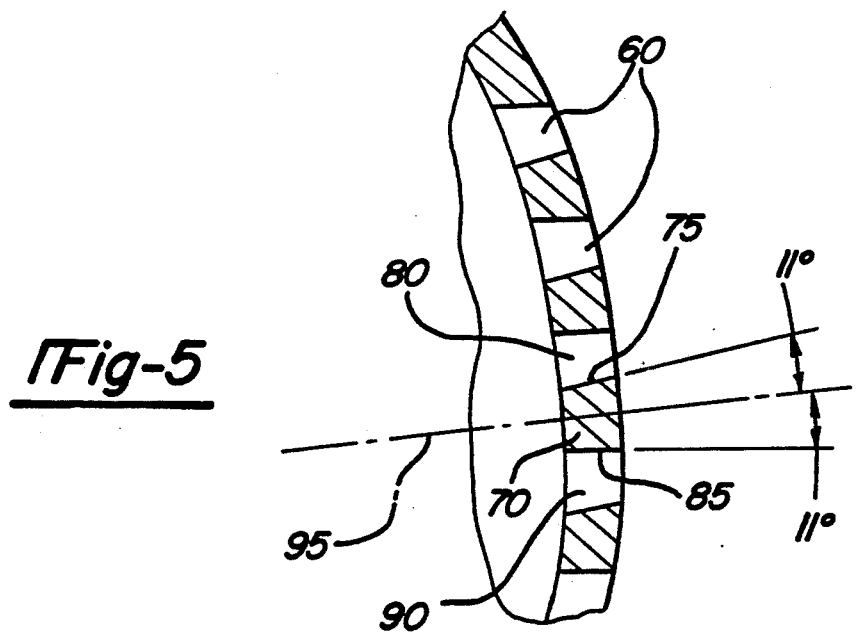
FIG. 5 is a further enlarged sectional view of the louvers taken from FIG. 3 along line 5.

As shown in FIGS. 4 and 5, the shape and disposition of the louvers 60 in one of the preferred embodiments is detailed. Specifically, the guard 20 is preferably composed of a rigid transparent plastic material. Because one of the purposes of the guard 20 is to confine particles and debris created by the saw blade during the sawing process, the outer height, H, of the louvers is limited to a maximum of 4 mm. This dimension is established by safety certification agencies such as Underwriters Laboratory ("UL") in the U.S. and CENELEC in Europe. As can best be seen in FIG. 5, the louvers 60 are wider towards the inner surface of the guard 20 and taper to a narrower dimension toward the outer surface of the guard. As diagrammatically depicted in FIG. 1, the tapered configuration of the louvers 60 enhances the line of sight visibility of the operator to the workpiece along the plane of the saw blade.

In particular, as best illustrated by way of example in FIG. 2, when a tall workpiece 50, such as a 4×4, is to be cut, the guard 20 is in the articulated position shown when the saw blade 30 is lowered into contact with the workpiece 50. In this position, the operator's natural line of sight to a mark on the top surface of the workpiece 50 is through the louvers 60 generally toward the upper area of the guard 20, with the exact line of sight depending upon factors such as the position and height of the operator, or the position and elevation of the saw, for example. It will be appreciated that the tapered boundary surfaces of the louvers 60 provide the operator with a direct line of sight along substantially the entire upper surface of the workpiece.

Figure 3:
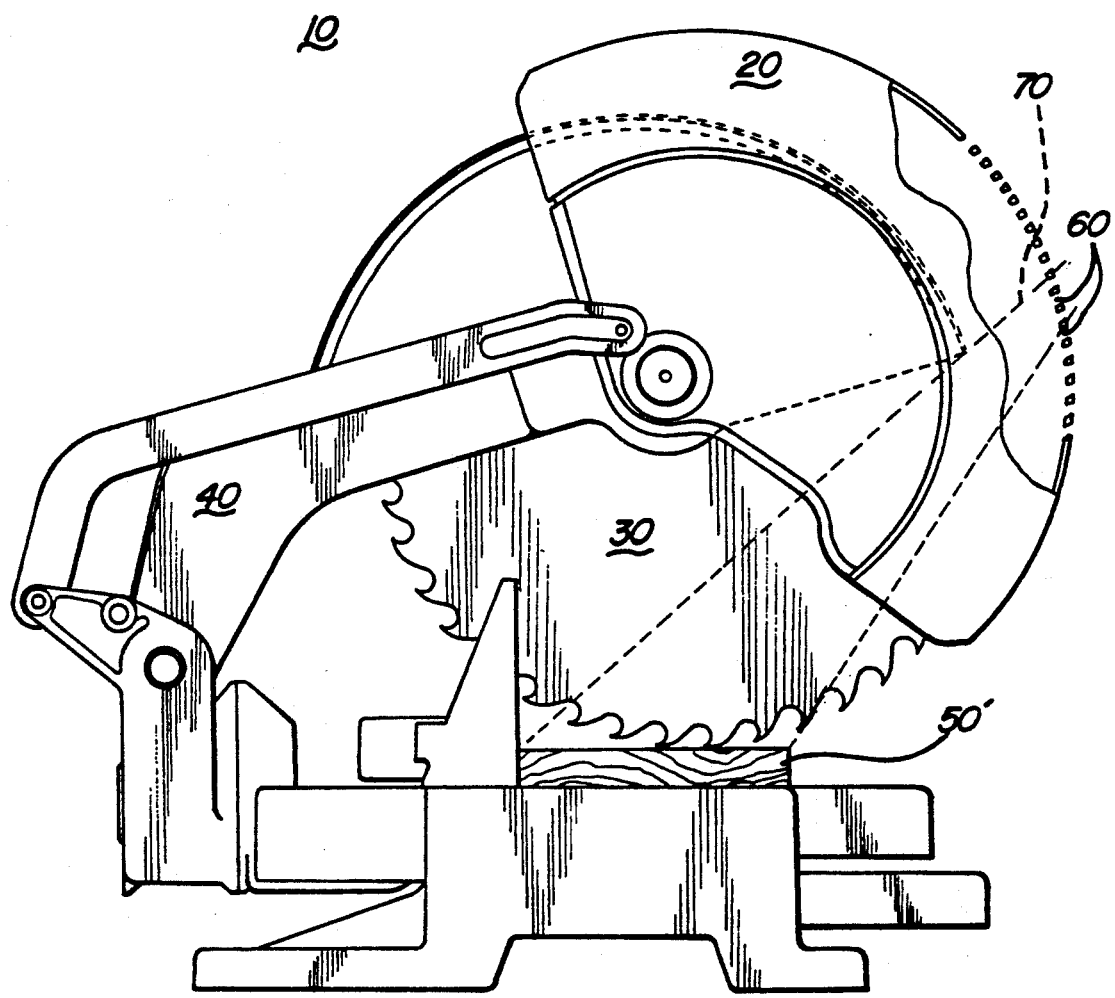
FIG. 3 is a side view of the power miter saw showing the saw blade and guard in the articulated position corresponding to the initiation of a cutting operation of a relatively short workpiece.

In FIG. 3, an additional view of the miter saw in a different articulated position is shown by way of example. In this view the workpiece 50' to be cut is relatively short, such as a 1×6. As can be seen from this figure, when the saw blade 30 is lowered into contact with the workpiece 50', the operator's natural line of sight to the top surface of the workpiece 50' is now through the louvers 60 toward the lower area of the guard 20, when the same operator is standing in the same position as that illustrated in FIG. 2. In this position as well, it will be appreciated that the configuration of the louvers provides the operator with a direct line of sight along substantially the entire upper surface of the workpiece 50', without significantly changing his or her position from that illustrated in FIG. 2.

Consequently, it will be appreciated that in both extreme positions illustrated in FIGS. 2 and 3, as well as the range of articulated positions in-between, the louvers 60 in the guard 20 enable the operator to work from a natural operating position in order to sight along the plane of the saw blade 30 to accurately align the saw blade with a mark on the workpiece.

In the preferred embodiment of the invention illustrated in FIGS. 4 and 5, the specific geometry of the louvers 60 is determined in the following manner. With particular reference to FIG. 5, the slat 70 defining the lower boundary 75 of the third louver 80 and the upper boundary 85 of the fourth louver 90 (from the top) comprise the reference boundary surfaces. As shown in FIG. 5, both the lower reference boundary surface 75 and the upper reference boundary surface 85 are formed at an 11° radial angle relative to the radial line 95 through the center of the slat 70. Consequently, the two reference boundary surfaces 75 and 85 define an included angle of 22°. All of the remaining lower boundary surfaces of the louvers 60 are formed parallel to the reference lower boundary surface 75 and all of the remaining upper boundary surfaces of the louvers 60 are formed parallel to the reference upper boundary surface 85. Consequently, as best shown in FIG. 4, it will be appreciated that, as one progresses downwardly from the reference slat 70, the lower boundary surfaces of the louvers 60 are formed at progressively greater radial angles. Significantly, as depicted in FIG. 1, this configuration enables the operator to maintain a stationary vision point of the workpiece from a natural operation position regardless of the angle of articulation of the guard.

In addition, as will also be appreciated by those skilled in the art, the present preferred configuration of the louvers 60 enhances the manufacturability of the guard 20 by facilitating convenient release of the formed plastic part from the mold.

Figure 6:
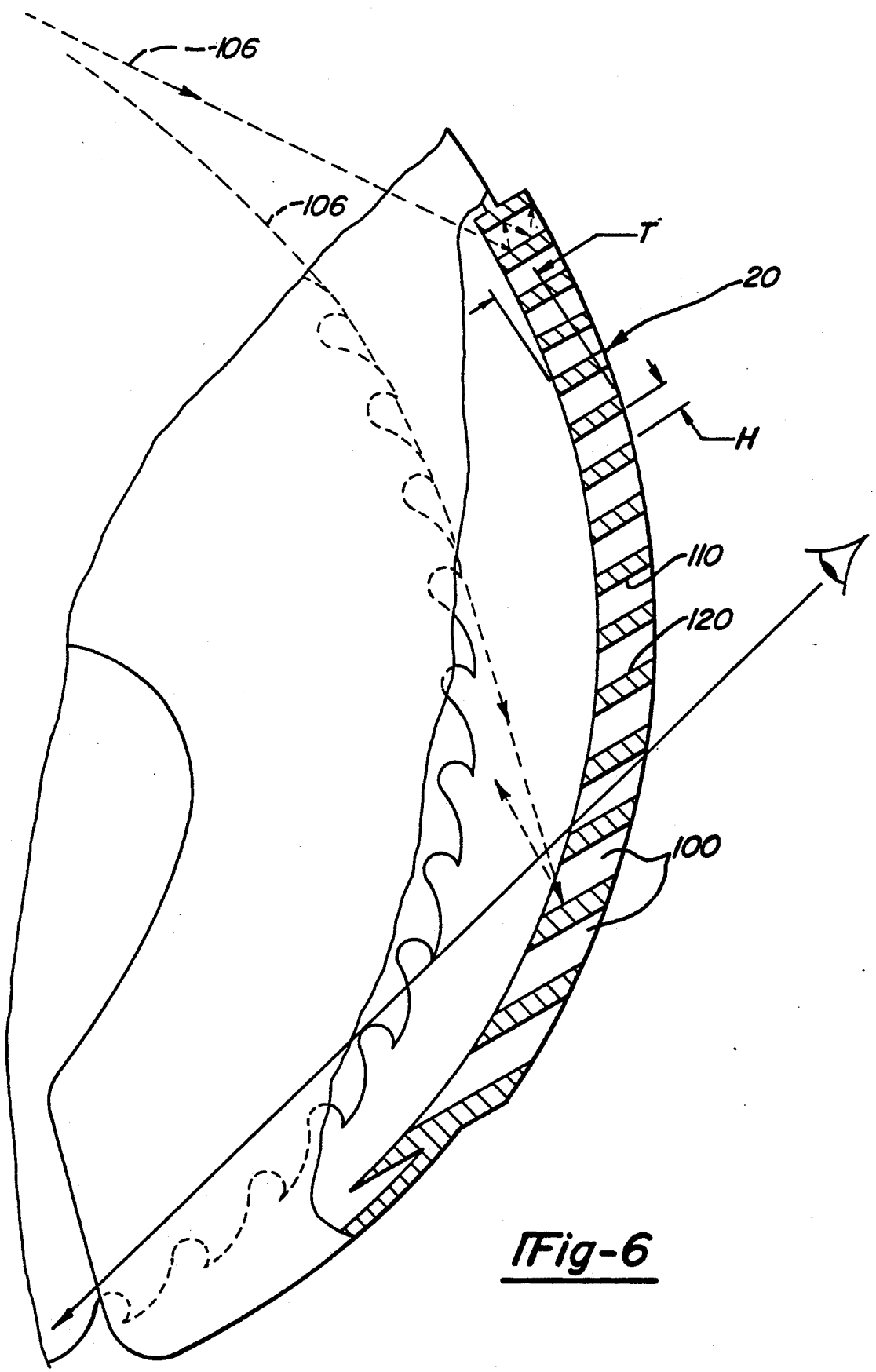
FIG. 6 is a similar sectional view of an alternative embodiment of the louvered saw blade guard.

Turning now to FIG 6, an alternative embodiment of a guard 20 according to the present invention is shown. In this embodiment, the upper and lower boundary surfaces 110 and 120 of all the louvers 100 in the guard 20 are substantially parallel. However, it will be noted that the height dimension ("H") of each of the louvers 100 is less than the thickness ("T") of the guard material as measured along the respective louver's boundary surfaces. This alternative louver configuration significantly minimizes the discharge of cutting debris through the louvers 100 in the guard 20, or at least serves to remove a sufficiently large percentage of the kinetic energy of the particles that are ejected so as to virtually eliminate the potential hazard or nuisance of ejected particles to the operator. As cutting debris is ejected tangentially from the tips of the saw blade, it will be appreciated that this function is accomplished in the embodiment illustrated in FIG. 6, by impeding the path through the guard 20 for such ejected particles. Consequently, any particles (diagrammatically illustrated by reference numeral 106) propelled by the cutting blade will either contact a boundary surface and upon deflection remain inside the guard 20 (as illustrated in the lower portion of FIG. 6), or lose a sufficient amount of its kinetic energy due to deflection in the louver spaces such that the resulting exit velocity from the guard is small and therefore not a hazard (as illustrated in the upper portion of FIG. 6). At the same time it will be appreciated that the alternative configuration of the guard 20 shown in FIG. 6 satisfies the above-described primary advantage of the present invention of providing the operator with a stationary direct line of sight along the saw blade to the workpiece from a natural operating position. Moreover, this line of visibility is provided in this embodiment, as well as in the previous embodiment, regardless of the articulated position of the guard from the lowest cut (e.g., small workpiece) to the highest cut (e.g., large workpiece) position of the miter saw blade.

The preceding discussion of the preferred and alternative embodiments has been provided for the purposes of illustration. It is recognized that, through exercise of ordinary skill in the art, the inventive concepts disclosed herein could be adapted to suit a variety of embodiments without departing from the scope or spirit of the invention.

What is claimed is:

1. A power saw having a circular disc-shaped cutting blade with cutting teeth disposed around its outer periphery, said power saw including a planar work surface for positioning a workpiece to be cut by the cutting blade, said cutting blade being movable relative to said work surface, the power saw being adapted to be operated by an operator normally positioned at an operating position relative to the power saw whereby the eyes of the operator are located above and displaced toward said operating position and away from the cutting blade so that the operator's line of sight forms an acute angle relative to the work surface; characterized in that said power saw further includes a unitary circumferential guard for protecting the operator from the cutting blade and for confining and directing cutting debris away from the operator, said guard being movably mounted to the power saw and comprising a pair of spaced substantially parallel side portions and an outer radial edge portion joining said side portions and extending circumferentially about the cutting blade to thereby define a channel that covers a radial portion of said cutting blade in a first position and is movable to expose the cutting teeth of said cutting blade in a second position, said guard having a plurality of louvers formed through said outer radial edge portion, said louvers being configured to prevent the direct ejection through said louvers of cutting debris emanating tangentially from the periphery of the cutting blade, while providing said normally positioned operator with an unobstructed line of sight through said louvers along the plane of the cutting blade to the interface between the cutting blade and the workpiece when said workpiece is positioned on said work surface; said outer radial edge portion of said guard having an inner edge surface and an outer edge surface defining a radial thickness therebetween, said louvers of said guard being tapered so as to provide a greater opening at said inner edge surface than at said outer edge surface.

2. The power saw of claim 1 wherein said louvers have a height defined as the opening of said louvers in the circumferential direction, wherein said height at said outer edge surface is no greater than four millimeters.

3. The power saw of claim 2 wherein each of said plurality of louvers in said guard is defined by upper and lower boundary surfaces and wherein the radial thickness of said outer edge radial portion of said guard along said boundary surfaces is greater than the height of said louvers at said outer surface.

4. The power saw of claim 1 wherein each of said plurality of louvers in said guard is defined by upper and lower boundary surfaces and wherein said upper boundary surfaces of all of said plurality of louvers are substantially parallel to one another and said lower boundary surfaces of all of said plurality of louvers are substantially parallel to one another.

5. The power saw of claim 1 wherein said power saw comprises a miter saw having the cutting blade mounted to an arm that is pivotable between a first inoperative position wherein the cutting blade is positioned above the work surface and a second operative position wherein the cutting blade is lowered into proximity to the work surface.

6. The power saw of claim 5 wherein the guard is pivotably mounted to said arm so a to pivot upwardly exposing the cutting teeth of the cutting blade as the arm of the miter saw is lowered.

7. The power saw of claim 6 wherein the miter saw is adapted to cut workpieces less than a predetermined maximum height when positioned on said work surface, and further wherein said plurality of louvers are configured so as to provide said normally positioned operator with an unobstructed line of sight along the plane of the cutting blade to the interface between the cutting blade and the workpiece for any size of workpiece less than said predetermined maximum height.

8. A power miter saw having a horizontally disposed planar work surface and a circular disc-shaped saw blade with cutting teeth disposed around its outer periphery, said blade being mounted to a movable arm pivotable between an inoperative position above the work surface through a range of operative positions as the saw blade is lowered into proximity to the work surface, said range of operative positions comprising the arcuate range of movement of said movable arm from an upper position wherein the saw blade initially contacts a workpiece positioned on said work surface having a maximum predetermined height to the lowermost position of said movable arm, said miter saw being adapted for operation by an operator normally positioned at an operating position relative to the miter saw whereby the eyes of the operator are located above and displaced toward said operating position and away from the saw blade so that the operator's line of sight forms an acute angel relative to said work surface; characterized in that said miter saw further includes a unitary circumferential guard for protecting the operator from the cutting blade and for confining and directing cutting debris away from the operator, said guard comprising a pair of substantially parallel spaced side portions and an outer radial edge portion joining said side portions and extending circumferentially about the saw blade to thereby define an arcuate channel for covering a radial portion of said saw blade, said guard being pivotally mounted to said movable arm so that the guard rotates from a first position wherein said radial portion of the cutting blade is covered radial edge portion thereof that are configured to prevent the direct ejection through said louvers of cutting debris emanating tangentially from the teeth of the saw blade, while providing said normally positioned operator with an unobstructed line of sight through said louvers along the plane of the saw blade to the interface between the cutting blade and a workpiece positioned on said work surface throughout said range of operative positions of said movable arm, said outer radial edge portion of said guard having an inner edge surface and an outer edge surface defining a radial thickness therebetween said louvers of said guard being tapered so as to provide a greater opening at said inner edge surface than at said outer edge surface.

9. The power saw of claim 8 wherein each of said plurality of louvers in said guard is defined by upper and lower boundary surfaces and wherein said upper boundary surfaces of all of said plurality of louvers are substantially parallel to one another and said lower boundary surfaces of all of said plurality of louvers are substantially parallel to one another.

10. The power saw of claim 8 wherein said louvers have a height defined as the opening of said louvers in the circumferential direction and wherein each of said plurality of louvers in said guard is defined by upper and lower boundary surfaces, and further wherein the radial thickness of said outer edge radial portion along said boundary surfaces is greater than the height of said louvers at said outer edge surface.

* * * * *